United States Patent
Klein et al.

(10) Patent No.: US 12,555,373 B2
(45) Date of Patent: Feb. 17, 2026

(54) AUTOMATED HAZARD RECOGNITION USING MULTIPARAMETER ANALYSIS OF AERIAL IMAGERY

(71) Applicant: International Business Machines Corporation, Armonk, NY (US)

(72) Inventors: Levente Klein, Tuckahoe, NY (US); Wang Zhou, White Plains, NY (US); Harini Srinivasan, Tarrytown, NY (US); Amit Kumar Pandey, Greensboro, NC (US); Estepan Meliksetian, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 754 days.

(21) Appl. No.: 17/825,483

(22) Filed: May 26, 2022

(65) Prior Publication Data
US 2023/0386199 A1 Nov. 30, 2023

(51) Int. Cl.
*G06V 10/764* (2022.01)
*G06T 7/12* (2017.01)
(Continued)

(52) U.S. Cl.
CPC .............. *G06V 20/188* (2022.01); *G06T 7/12* (2017.01); *G06T 7/543* (2017.01); *G06T 7/62* (2017.01);
(Continued)

(58) Field of Classification Search
None
See application file for complete search history.

(56) References Cited

U.S. PATENT DOCUMENTS

| 10,467,475 B2 * | 11/2019 | Parisa | G06F 18/256 |
| 10,614,307 B2 * | 4/2020 | Stanley | G01B 11/28 |

(Continued)

FOREIGN PATENT DOCUMENTS

| AU | 2010300477 A1 * | 4/2012 | G06Q 10/10 |
| AU | 2010340073 A1 * | 7/2012 | G06V 20/188 |

(Continued)

OTHER PUBLICATIONS

Wamburu et al., EP51E-1873: A Deep Learning Framework for Vegetation Management for Electrical Utilities Using Multispectral High-Resolution Satellite Imagery, AGU Meeting, Washington DC, Dec. 14, 2018, https://agu.confex.com/agu/fm18/meetingapp.cgi/Paper/459704.

(Continued)

*Primary Examiner* — Tsung Yin Tsai
(74) *Attorney, Agent, or Firm* — Garg Law Firm, PLLC; Rakesh Garg; James Olsen

(57) ABSTRACT

An embodiment includes identifying a tree type of vegetation depicted in an image. The embodiment segments that portion of the image using edge-detection processing resulting in a contour line that defines a tree perimeter. The embodiment detects that the tree is within a buffer distance from a power line. The embodiment determines the tree's species by comparing the contour line to candidate contour lines of different tree species and calculates a diameter of the tree's crown using the contour line. The embodiment estimates the tree's height using the species and the diameter of the crown. The embodiment calculates a risk value for the tree based on a risk of contact between the power line and the tree and issues a work order to maintain the tree to prevent contact with the power line.

20 Claims, 7 Drawing Sheets

(51) Int. Cl.
- *G06T 7/543* (2017.01)
- *G06T 7/62* (2017.01)
- *G06V 10/44* (2022.01)
- *G06V 10/774* (2022.01)
- *G06V 20/10* (2022.01)

(52) U.S. Cl.
CPC .......... *G06V 10/443* (2022.01); *G06V 10/764* (2022.01); *G06V 10/774* (2022.01); *G06T 2207/10032* (2013.01); *G06T 2207/20081* (2013.01); *G06T 2207/20084* (2013.01); *G06T 2207/30188* (2013.01)

(56) References Cited

U.S. PATENT DOCUMENTS

| | | | | |
|---|---|---|---|---|
| 11,244,161 | B2* | 2/2022 | Appel | G08B 21/02 |
| 11,270,111 | B2* | 3/2022 | Klein | G06V 20/188 |
| 2011/0150290 | A1* | 6/2011 | Welty | G06V 20/188 |
| | | | | 382/110 |
| 2013/0211721 | A1* | 8/2013 | Parisa | G06V 10/811 |
| | | | | 702/2 |
| 2014/0164306 | A1* | 6/2014 | Datta | G06T 17/05 |
| | | | | 706/46 |
| 2017/0277953 | A1* | 9/2017 | Stanley | G06V 20/176 |
| 2020/0225075 | A1* | 7/2020 | Shao | G01S 13/865 |
| 2020/0250424 | A1* | 8/2020 | Klein | G06T 7/13 |
| 2021/0034866 | A1* | 2/2021 | Appel | G06V 20/20 |
| 2021/0118117 | A1 | 4/2021 | Albrecht et al. | |

FOREIGN PATENT DOCUMENTS

| | | |
|---|---|---|
| CN | 111898838 A | 11/2020 |
| WO | WO-2011159855 A1 * 12/2011 | G06V 10/811 |

OTHER PUBLICATIONS

Klein, Integration of tree species for better tree height estimates—explained by Wang Zhou, IBM, @leventek, Sep. 30, 2020, https://mobile.twitter.com/leventek/status/1311297970218979328.

Klein et al., Quantification of Carbon Sequestration in Urban Forests, International Conference on Machine Learning (ICML 2021) Workshop, Jul. 20, 2021.

Williams et al., Three-dimensional Segmentation of Trees Through a Flexible Multi-Class Graph Cut Algorithm (MCGC), Mar. 21, 2019.

Abdullah et al., Estimating Tree Height Based On Tree Crown from UAV Imagery, Malaysian Journal of Sustainable Environment, [S.I.], vol. 9, No. 1, pp. 99-118, Mar. 31, 2022.

Zhang et al., Individual Urban Tree Species Classification Using Very High Spatial Resolution Airborne Multi-Spectral Imagery Using Longitudinal Profiles, Remote Sens., Jun. 11, 2012, pp. 1741-1757.

IBM, IBM Environmental Intelligence Suite: Vegetation Management, 2022, https://www.ibm.com/products/environmental-intelligence-suite/vegetation-management.

MRLC, Multi-Resolution Land Characteristics (MRLC) Consortium, 2022, https://www.mrlc.gov/.

Aidash, Aidash, 2022, https://www.aidash.com/.

Liveeo, Monitor Infrastructure Networks from Space, 2022, https://live-eo.com/.

Capgemini, GIS Analytics—For Vegetation Management and Risk Mitigation, Jul. 30, 2021, https://www.capgemini.com/resources/gis-analytics/.

* cited by examiner

AUTOMATED HAZARD RECOGNITION USING MULTIPARAMETER ANALYSIS OF AERIAL IMAGERY

BACKGROUND

The present invention relates generally to a method, system, and computer program product for data processing. More particularly, the present invention relates to a method, system, and computer program product for automated hazard recognition using multiparameter analysis of aerial imagery and weather data.

Risk management refers to the efforts taken by a company to identify and reduce risk factors associated with various sorts of hazards or risks. Businesses in most, if not all, industries confront risks of some kind, and depending on the types and magnitude of those risks, they may place more or less emphasis on mitigation of risk management. Effective risk management is highly emphasized in inherently dangerous industries, such as those where people work in close proximity to dangerous materials or dangerous conditions, and mitigation of operational risks is usually a high priority due to the importance of maintaining a safe work environment despite the dangers involved.

Power generation and transmission is an example of a dangerous industry. A typical power generating station generates electrical power having a voltage of about 30,000 volts. The electrical power travels to customers along transmission lines and distribution lines where voltage levels ranging from 10,000 volts to over 700,000 volts are not uncommon. These extremely high voltage levels are capable of causing an electrical current to arc to conductive objects that are too close to the power lines. A typical scenario involves arcing through nearby trees that grow too close or are blown too close to the power lines. This scenario can cause both a power outage and a fire and electrical shock hazard that line repair crews are called on to repair. Such scenarios present a risk to repair crews and anyone else present when the incident occurs. Trees can also fall on the power line and causing breakage of the wires that cause power outage for one or multiple locations.

SUMMARY

The illustrative embodiments provide for automated hazard recognition using multiparameter analysis of aerial imagery. An embodiment includes identifying, by a processor, a tree type of vegetation depicted by a portion of an inputted aerial image. The embodiment also includes segmenting, by the processor, the portion of the inputted image resulting in a contour line that defines a perimeter of a tree and shape characteristics depicted in the portion of the inputted image. The embodiment also includes detecting, by a processor, that the tree is within a buffer distance from a power line by determining a distance between a depiction of the power line in the aerial image and a point on the contour line. The embodiment also includes determining, by the processor, a species of the tree by comparing the contour line to candidate contour lines corresponding to respective different species of trees. The embodiment also includes calculating, by the processor, a shape and a diameter of a crown of the tree using the contour line. The embodiment also includes estimating, by the processor, a height of the tree based on the species of the tree and the diameter of the crown of the tree. The embodiment also includes calculating, by the processor, a risk value for the tree based on a risk of contact between the power line and the tree. The embodiment also includes issuing, by the processor, a work order to maintain the tree to prevent contact with the power line based on the risk value. Other embodiments of this aspect include corresponding computer systems, apparatus, and computer programs recorded on one or more computer storage devices, each configured to perform the actions of the embodiment.

Some embodiments also include establishing the ratio of roots to above ground tree extensions, where the depth and distribution of roots is identified for a plurality of tree species. Some such embodiments also include identifying prevalent wind directions and loads that such winds have on a tree. Some such embodiments also include identifying the surroundings of a tree, where the tree is located in a position that is isolated from other trees, or where the tree is part of a forest where other trees may be impacting the wind conditions and wind load on the trees and calculating based on tree shapes and tree species the likely breaking point for a tree under a wind or ice load. Some embodiments include determining the soil type for the root system and the soil moisture for that particular area based on precipitation conditions. In some such embodiments, the resistance of trees from uprooting is determined, where a probability that a tree under a given wind load will be uprooted is determined based on soil type, tree species and from the amount of precipitation. Some embodiments include calculating, by the processor, a risk value for the tree based on the likelihood that the tree contacts the power line. The embodiment also includes issuing, by the processor, a work order to maintain the tree to prevent contact with the power line based on the risk value. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
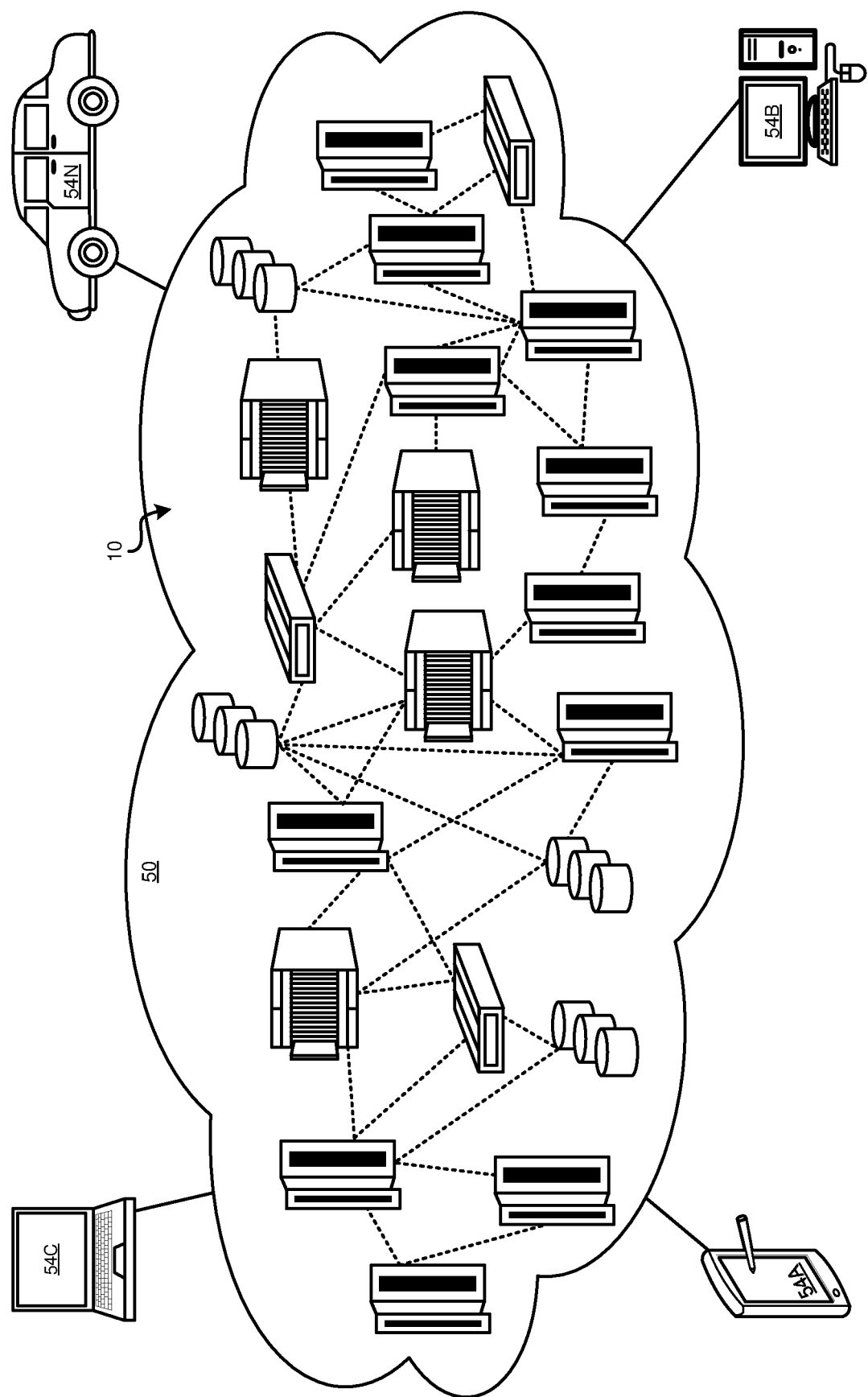
FIG. 1 depicts a cloud computing environment according to an embodiment of the present invention.

Contact between trees and power transmission lines is the most common cause of power outages. The weight of a tree can break the lines or trigger a safety switch to shut off power. The tree health can be also a cause of concerns as trees may be mechanically unstable and ready to collapse. The arcing of electrical current that results from such contact poses actual or potential safety hazards to repair crews and anyone else in the vicinity. To mitigate against such hazards, various state and Federal agencies have developed recommendations for minimum clearances that should be maintained free of trees around transmission and distribution lines (sometimes collectively referred to herein as "power lines"). This clearance zone management is sometimes referred to as vegetation management.

Vegetation management techniques have been developed to control vegetation growth on and near power lines through mechanical and chemical methods. Within the field of vegetation management, line-clearance trimming refers to cutting, pruning, clearing, or removing vegetation that is close to or near power lines. This can include trees or branches that have grown in a direction approaching the lines. In addition, this can include trees that are hazardous to power lines because of a risk the tree may fall onto the power lines due to sickness or a lightning strike. Current vegetation management processes generally involve sending out crews to visually inspect power lines and cut or trim trees as it appears necessary. Follow-up crews may also be dispatched to verify that the work was performed properly or at all.

Unfortunately, maintaining these clearances is an enormous task. In the United States, the electrical grid includes an estimated 200,000 miles of transmission lines and 5.5 million miles of distribution lines. Relying on work crews to traverse these 5.7 million miles of power lines to locate and eliminate problematic trees is very time consuming. It has been estimated that the task of traveling along these power lines just to document problematic trees would require over 130 years for someone to complete. In practice, these vegetation management programs often require temporarily hiring additional personnel, which may include inexperienced personnel. This influx of new crew members increases cost due to the training required and can increase the likelihood of inaccurate identification of problematic trees due to human error. Given the importance of competently completing this task on a regular basis, there has been considerable interest in finding a reliable automated process that can quickly and accurately identify problematic trees.

Aspects of the present disclosure address the deficiencies described above by providing mechanisms (e.g., systems, methods, machine-readable media, etc.) that perform automated hazard recognition using multiparameter analysis of aerial imagery. The present disclosure recognizes that there may be many different factors that affect whether a tree presents a hazard to nearby power lines, and sometimes the presence of that hazard can fluctuate over time. Because of this, a hazard posed by a tree may be overlooked using prior techniques or infrequent inspections. However, disclosed embodiments allow for improved detection of such hazards by performing an enhanced tree analysis that uses a multiparameter approach to determining tree species and tree height. It is important to reliably determine a tree's species because allometric relationships used to determine tree height vary depending on the species of the tree and number of data points analyzed for establishing an allometric equation. It is important to accurately determine a tree's height to avoid overlooking trees that pose a hazard to power lines and, on the other hand, avoid unnecessary removal of trees that are mischaracterized as hazardous. In some embodiments, the multiparameter approach to determining tree species, tree health, tree flammability, tree shape and tree height includes applying multiple parameters to a species detection process and applying multiple parameters to a tree species and height detection process, both of which independently and collectively provide for improved accuracy over prior techniques. For example, in some embodiments, a multiparameter approach to determining tree species includes application of parameters such as spectral information, image texture, and geometric characteristics (e.g., shape, dimensions, etc.). In some embodiments, a multiparameter approach to determining tree height includes application of parameters such as seasonal weather patterns, extreme weather likelihood, surrounding vegetation, solar radiation, and soil composition that can cause variations of the tree's geometry. Based on these observations, the methods of the present disclosure may apply instance-based learning approaches, making the system domain independent and easy to adapt to different climates, forest regions, or other ecological or environmental variations.

The terms "aerial imagery" and "aerial images" as used to herein refer to images produced by exposing an image sensor or film (i.e., digital or film photography), located in or above the Earth's atmosphere, to solar energy reflected from Earth, and may include vertical and oblique images taken from a satellite or a piloted or drone aircraft. The aerial imagery may be also based on a radar signal, where emission of a radio frequency signal is bounced back from the Earth's surface and generating an imagery is the radio frequency domain. An automated hazard recognition system analyses aerial images to identify objects near power lines that present a current hazard and identifies other objects near power lines that present a future hazard and schedules maintenance accordingly. For example, the automated hazard recognition system can be configured to, in response to the identification of an object near power lines that presents a current hazard, create a work order that requests dispatch of a next available work crew to remove the potentially hazardous object from on or near the power line. As another example, the automated hazard recognition system can additionally or alternatively be configured to, in response to the identification of an object near power lines that presents a future hazard, determine a time in the future before it is likely to become a hazard and create a work order that requests dispatch of a work crew to remove the potentially hazardous object from on or near the power lines before it is likely to become a hazard or use some strengthening technique to prevent a tree from contacting power lines. In some embodiments, the automated hazard recognition system identifies additional hazard(s) created by delayed maintenance work by quantifying a delta increase in the hazard.

Upon completion of the work, the automated hazard recognition system can verify that the tree has been maintained as set forth in the work order to prevent contact with the power line by analyzing a second aerial image that is acquired after the work order was issued. For example, in some embodiments, the automated hazard recognition system performs an aerial image-based inspection of the area to verify that the work crew created enough distance between the power line and the potentially hazardous object and eliminated all of the identified hazards. If any hazard is still present, the automated hazard recognition system creates a new map that outlines all areas where the hazard(s) need to be removed and reissues a work order to dispatch a team to remove the hazard(s). In some embodiments, the automated hazard recognition system verifies that the tree has been maintained as set forth in the work order and records in a database that a hazard posed by the tree has been removed.

In some embodiments, work orders that are created for current hazards are set to be high priority and work orders that are created for future hazards are initially set to be low priority. In some such embodiments, low priority work orders may automatically be pushed back in the queue to allow a high priority work order in its place so that the high priority work order will be completed before the low priority work order. In some such embodiments, in order to prevent excessive delays, work orders for future hazards can be converted from low priority to high priority before they become present hazards. For example, in some embodiments, low priority work orders for future hazards can be assigned respective predicted hazard dates representative of when the future hazards are predicted to become present hazards. In some embodiments, a low priority work order for a future hazard is automatically converted to a high priority work order prior to its predicted hazard date. In some embodiments, a low priority work order for a future hazard is automatically converted to a high priority work order some designated threshold amount of time prior to its predicted hazard date. In some such embodiments, the threshold amount of time is a default system value or a value set by a user. In alternative embodiments, the threshold amount of time is calculated by the automated hazard recognition system using a probability distribution that is based on factors relevant to the particular hazard, such as growth rate for a particular species of tree, so that the corresponding work order is converted to a high priority before there is a significant probability that the future hazard will become an actual present hazard. As an example, a particular tree may be detected and the species and size identified, and based on known growth rate for that species, long term health of that tree species, and the flammability of the tree, the system predicts that the tree will become a current hazard in two years. The work order is initially set to a low priority. However, if the threshold amount of time for priority escalation is set to one year and a year goes by without it being removed, the work order will be one year away (equal to the threshold amount of time) from becoming a present hazard, so the priority is escalated to high priority.

In some embodiments, the potentially hazardous object is a tree or other growing vegetation. In some embodiments, the location of local power lines can be identified by accessing governmental databases, power company databases or private third-party databases. Power poles can also be observed in high-resolution imagery or extracted from Light Detection and Ranging (LIDAR) imagery that creates a three-dimensional cloud of all features above the earth surface. Power lines have well-defined features like connecting power lines and they tend to follow streets or lines of houses. Once identified, the location of power lines can be identified by the system as line segments overlaid on a local map. The line segments can be characterized as power lines by various methods including hue, textual identification, or for example bold lines, dotted lines, dashed lines, etc. In very high-resolution images, the line locations can be identified, and the images can be used to verify the power line locations or detect if any power lines have been relocated, removed, or added.

In some embodiments, the automated hazard recognition system is configured to analyze a time series of satellite images to establish vegetation on the ground where trees are growing and track changes in the vegetation development in the past and project vegetation growth for the future. For example, in some embodiments, the automated hazard recognition system uses image segmentation and spectral information to perform a land cover classification process on aerial images to separate different land cover classes. In general, vegetation can be separated from other classes like buildings or roads using spectral information and reflectance of the light. Within the vegetation classes, there are many subcategories that can exist: grassland, trees, agricultural crops, shrubs, etc. Once a subclass like vegetation is separated, that unique class is segmented to identify individual components (trees, crops, bushes) that can be separated and identified, including overlapping regions (i.e., regions that include a mix of subclasses). As an example, individual trees can be identified within a forest based on the shape and size of canopy extent, where each tree is allocated a certain size, minimum distance between the center of the canopy, health of the trees, competition for sunlight and water, soil nutrients or cover.

In some embodiments, the automated hazard recognition system identifies a tree canopy based on a spectral gradient where the middle of the canopy has a maximum value of spectral reflection or texture that gradually decreases towards the edges, which will have decreased spectral and texture values as compared to the central maxima. In another embodiment, the automated hazard recognition system uses the shape of trees to determine the maximum occupancy for an area based on number of trees, their height, shape, and species that can fill a certain area based on canopy diameter. It is understood that for a tree to survive, it requires at least a certain minimum land footprint, access to solar radiation, and protection from direct exposure to extreme weather events like wind gusts or hurricanes. The automated hazard recognition system uses transition points, or saddles of change, between neighboring trees to draw a boundary between trees and create a contour line that encloses a feature that has similarities in values within. In some embodiments, the automated hazard recognition system identifies individual trees in the imagery and applies a maximum filling algorithm such that smaller and larger geometrical shapes can fill in the image. In case of trees, it is expected that the geometry will have mainly circular shapes with significant variations based on tree species, while buildings will have more rectangular shapes and will restrict the expansions of the trees in those directions by limiting the amount of area that trees can possibly occupy. In some embodiments, the automated hazard recognition system gains further insight into the land cover in particular location based on the size and proximity of trees and other objects. In some embodiments, once the automated hazard recognition system identifies an object using segmentation, the automated hazard recognition system can further classify objects to separate them based on other characteristics like tree species, crop type, bush categories, etc. In some embodiments, the automated hazard recognition system extracts a scaling relation for each object and subclass that reveals the ratio between two-dimensional features and three-dimensional values. In some embodiments, the automated hazard recognition system method applies tree height estimates to trees based on two-dimensional canopy diameter calculations.

In some embodiments, the automated hazard recognition system apples a geometric scaling factor to individually identified objects where a two-dimensional feature is used to estimate the height of the objects. In order to identify an object, the automated hazard recognition system starts with a two-dimensional aerial image that is acquired at multiple different wavelengths and applies an image classification algorithm as part of a land cover classification process to the aerial image to identify different land cover classes or at least identify vegetation regions and non-vegetation regions. In some embodiments, the automated hazard recognition system uses a machine-learning classification process that is an application of artificial intelligence (AI) technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as image classification.

As used herein, the term "neural network model" can refer to a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, where data with known outcomes is inputted into the computer model, outputs regarding the data are compared to the known outcomes, and/or the weights of the computer model are autonomously adjusted based on the comparison to replicate the known outcomes. As used herein, the term "training data" can refer to data and/or data sets used to train one or more neural network models. As a neural network model trains (e.g., utilizes more training data), the computer model can become increasingly accurate; thus, trained neural network models can accurately analyze aerial image data with unknown regions, and based on lessons learning from training data, accurately classify regions of aerial images (e.g., as vegetation class or non-vegetation class). Example neural network models that can be used with implementations of the disclosed embodiments include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), Markov chain ("MC"), Hopfield network ("HN"), Boltzmann machine ("BM"), deep belief network ("DBN"), deep convolutional network ("DCN"), convolutional neural network ("CNN"), deconvolutional network ("DN"), deep convolutional inverse graphics network ("DCIGN"), generative adversarial network ("GAN"), liquid state machining ("LSM"), extreme learning machine ("ELM"), echo state network ("ESN"), deep residual network ("DRN"), Korhonen network ("KN"), support vector machine ("SVM"), and/or neural Turing machine ("NTM").

Thus, in some embodiments, the automated hazard recognition system identifies one or more different land cover classes in aerial images using a neural network that has been trained using a training data set that includes exemplary images for each class of distinction. In some embodiments, one or more neural networks are used to classify regions of aerial images into land cover classes and then into subclasses. For example, in some embodiments, the automated hazard recognition system identifies regions of aerial images that are classified as vegetation class and then classify portions of the vegetation regions into subclasses, for example, trees, shrubs, crops, etc.

In some embodiments, once the automated hazard recognition system identifies the classes and subclasses, the automated hazard recognition system identifies objects within the boundaries of classified regions. In some embodiments, the automated hazard recognition system identifies individual objects in each region or in one or more regions having a specified class or subclass. For example, in some embodiments, the automated hazard recognition system identifies individual objects in each region classified as being in one of the subclasses of the vegetation class, or as being in a trees subclass of the vegetation class. In some embodiments, the automated hazard recognition system identifies individual objects by analyzing the dimensions, orientation, or symmetry of the objects, and segmenting the images on parameters that are characteristic to the corresponding regions, such as the extent of the canopy of trees based on age and climate. In one example, the automated hazard recognition system identifies a region of an aerial image as being in the vegetation class and in the forest subclass, and then identifies individual trees in the identified forest region.

In some embodiments, the automated hazard recognition system determines a canopy diameter for each identified tree and verifies that it is not overlapping with adjacent trees or other regions. In some embodiments, the automated hazard recognition system first verifies that a tree's canopy is at least somewhat circular in shape before measuring the canopy diameter. In some embodiments, the automated hazard recognition system verifies that a tree's canopy is at least somewhat circular by measuring the circularity of the tree's canopy and comparing the result to a threshold value indicative of a minimum level of circularity. In some embodiments, the automated hazard recognition system measures circularity using an area-to-perimeter ratio, for example as shown as Expression (1):

$$C = \frac{4\pi A}{P^2} \quad (1)$$

In Expression (1), C represents circularity, P is the convex perimeter (the perimeter of the convex hull that encloses the canopy), and A is the area. For a perfect circle, C=1. As the shape of the canopy gets less circular, the value of C decreases. As the canopy gets less circular, the value of C gets lower. Thus, a threshold value for circularity can be set between 0 and 1 depending on how much shape irregularity is acceptable. In an alternative embodiment, circularity C can be the reciprocal of Expression (1), in which case the perfectly circular canopy has $\underline{C=1}$ and C increases as the canopy gets less circular.

In some embodiments, the automated hazard recognition system estimates the tree height using height-to-width scaling data. In some embodiments the height-to-width scaling data is a general scaling that is established for all species of trees. In some embodiments, the automated hazard recognition system further classifies trees into individual tree species where the spectral and texture information is used to create one or multiple subclasses that have tree species identified for the respective regions. For example, in some embodiments, the automated hazard recognition system uses a binary classification algorithm to classify trees as perennial or deciduous based on greenness detected during late autumn-winter-early spring. While the automated hazard recognition system carries out classification at individual tree level in the above description, alternatively the automated hazard recognition system can perform classification for a larger area that contains multiple trees from the same species.

Once the individual tree species have been identified, the automated hazard recognition system determines the height of each tree. In some embodiments, the automated hazard recognition system calculates a maximum diameter across the crown of the tree (also known as a maximum crown spread measurement), where the crown refers to the mass of foliage and branches growing outward from the trunk of the tree. The shape of the trees will also include the identification of the tree trunk diameter, the density of the tree, the mechanical hardness, and potentially the breaking point for the tree. Unless otherwise indicated, the term "crown diameter" as used herein refers to maximum diameter across the crown of a tree. The automated hazard recognition system measures crown diameter by measuring the maximum width of the crown along any axis that extends parallel to the ground from a point on the dripline on one side of the tree to another point on the dripline on the opposite side of the tree, where dripline refers to the outer boundary to the area located directly under the outer circumference of the tree's crown.

To determine the tree height, the automated hazard recognition system extrapolates a three-dimensional height from the two-dimensional aerial image. In general, the height of a tree is related to diameter of the crown of the tree according to a statistical, physical, or allometric relationship that varies depending on the species of the tree. The statistical relationship can be described as an allometric relationship (or allometric equation) in which the crown diameter varies with tree height according to a pair of allometric constants—the allometric coefficient and the allometric offset. The allometric coefficient and allometric offset constants vary according to the species of the tree.

In some embodiments, the automated hazard recognition system may be evaluating a set of aerial images taken of different areas within a particular ecoregion such that the diversity and characteristics of tree species can be expected to be constant in the set of images. In some such embodiments, tree heights for trees in a subset of the set of aerial images is measured using known techniques for measuring tree height using a Light Detection and Ranging (LIDAR) system. The tree heights collected using LIDAR are then grouped according to tree species, and linear regression is applied to the LIDAR data to derive allometric constants each tree species.

In alternative embodiments, the automated hazard recognition system has access to vegetation data that may be used to calculate tree height from crown diameter. For example, allometric equations are known and are publicly available that provide for extrapolation and estimation of various dendrometric quantities, including the statistical relationship between tree height and crown diameter on a species-by-species basis. In some embodiments, the automated hazard recognition system has access to such data.

Table 1 shows an example of data collected by LIDAR or from another data source that includes allometric constants for several tree species.

TABLE 1

| SPECIES | ALLOMETRIC COEFFCIENT | ALLOMETRIC OFFSET |
|---------|----------------------|-------------------|
| Hackberry | 2.162081 | 0.0 |
| Live Oak | 2.082728 | 0.0 |
| Pecan | 1.781613 | 0.0 |
| Red Oak | 1.897609 | 0.0 |
| White Oak | 2.021644 | 0.0 |
| Ash | 2.082792 | 0.0 |
| Cedar Elm | 2.146716 | 0.0 |

In some embodiments, the automated hazard recognition system uses the data in Table 1 with an allometric equation such as Expression (2) to estimate tree height from crown diameter:

$$H = \frac{D-I}{S} \qquad (2)$$

In Expression (2), H is the tree height and D is the crown diameter. The crown diameter is calculated as described above. Also, S is an allometric coefficient and I is an allometric offset, examples of which are shown in Table 1, where S and I are specific to the species of the tree being measured.

Additional parameters provide more accurate predictions towards a tree height. These parameters include but are not limited to local weather and climate patterns, soil composition, elevation, geographical area, and surrounding vegetation. In some embodiments, the automated hazard recognition system can access textual and image data from additional resources such as social media, crowdsource gathered data, weather reports, scientific journals, and technical reports to improve tree height prediction. In some embodiments, the automated hazard recognition system contains or has access to a library of tree heights in relation to species and crown diameter. The additional parameters can be associated with respective weight values to adjust the predicted tree heights.

Once the automated hazard recognition system has established allometric constants for scaling for all tree species detected in the imagery, the automated hazard recognition system uses the allometric constants to calculate tree heights. In some embodiments, each tree delineated is first associated with a tree species, then the crown diameter of each tree is calculated, and then an allometric constant is applied to determine a height of each tree. This is applied systematically for all trees that are detected in the imagery. In case the tree is not identified to belong to any particular species, the mean of the two dominant species in the ecoregion or in the set of aerial images under evaluation will be used.

In some embodiments, a time series of satellite images are analyzed to locate trees, track changes in the trees, and project tree growth for the future. In some embodiments, the vegetation in close proximity (e.g., within a minimum safe distance or mandated regulatory distance of power lines) are analyzed to identify individual trees based on spectral indices that track a vegetation index (e.g., Normalized Difference Vegetation Index), texture analysis of the trees, and geometric shape analysis of the trees. Tree delineation from the images creates polygons around tree crown perimeters that identify the extent of tree branches. Inside the polygons, one or more trees may be present. The power lines can be modeled as a line segment with variable widths extending on both sides of a single or multiple lines located along a road or transmission corridor. Intersections between power lines (line segments that have a certain width) and vegetation (closed polygons) can pinpoint all trees that are intersecting or are located within a buffer zone around the power line. Accordingly, systems and methods according to disclosed embodiments identify trees within a predetermined buffer zone of a power line and calculate a risk score based on tree proximity to the power line and vegetation encroaching the power lines.

In some embodiments, spectral signatures are utilized to detect potentially hazardous objects such as trees or other vegetation. As sunlight strikes different objects, the objects will absorb certain wavelengths and reflect other wavelengths. Vegetation cell structure has evolved to reflect near-infrared (NIR) wavelengths light, whereas the chlorophyll or the plant's pigment absorbs the visible wavelengths of light. A remote imaging sensor, for example a moderate-resolution imaging spectroradiometer (MODIS), can be used to capture spectral data in 36 spectral bands.

The spectral signatures can be processed by software to determine a ratio of NIR light to visible light with a focus on red light waves. To determine the ratio of NIR light to red light, a system can generate a quotient of the difference of NIR light and red light over the sum of NIR light and red light. In general, the greater the concentration of NIR light to visible light, the denser the vegetation. In contrast, the greater the concentration of visible light to NIR light, the sparser the vegetation. The remote imaging sensor can be located on board a satellite, an unmanned aerial vehicle (UAV), an aircraft, or on an elevated location.

In addition to detecting vegetation growth, spectral bands can be used in accordance with aspects to identify various other vegetative characteristics. For example, the blue band can be used to distinguish soil from vegetation. The green band can be used to assess plant vitality. The red band can be used to determine a vegetative slope. The NIR-1 band can be used to determine biomass concentration. The NIR-2 band can be used to perform a more in-depth biomass analysis. The short-wave infrared (SWIR) band can be used to determine soil moisture content. Thirty-six spectral bands can be detected using the remote imaging sensor. These spectral bands singularly and in combination can be used to detect various other vegetative characteristics including plant species.

In some embodiments, the height of each tree can be predicted using the tree species and tree crown size as described above. The tree height prediction can also consider sparse LIDAR data and various characteristics of the tree's local ecoregion, such as the aggregated weather conditions (e.g., wind gust, wind speed, wind direction, soil moisture, solar irradiance, and temperature) and the tree's surroundings (e.g., isolated tree or in a forest and common tree species).

An embodiment can be implemented as a software application. The application implementing an embodiment can be configured as a modification of an existing vegetation detection system or risk management system, as a separate application that operates in conjunction with an existing vegetation detection system or risk management system, a standalone application, or some combination thereof. For example, the application causes the vegetation detection system or risk management system to perform the steps described herein, which improve hazard detection through the use of disclosed automated species and height detection processes that provide for improved accuracy over prior techniques.

In one embodiment of the present disclosure, system, methods, and algorithms may be presented to automatically recognize hazards posed by trees or other vegetation or structures to power lines using a multiparameter analysis of aerial imagery. Semi-automatic machine learning algorithms may be provided to automatically classify the species and/or height of trees, e.g., by using parameters described herein as features of an input feature vector. In some embodiments, the methods of the present disclosure reduce the number of adjustments and corrections required for output data as a result of tighter tolerances that are possible using disclosed multiparameter analysis techniques, resulting in an efficient and accurate approach to hazard recognition.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
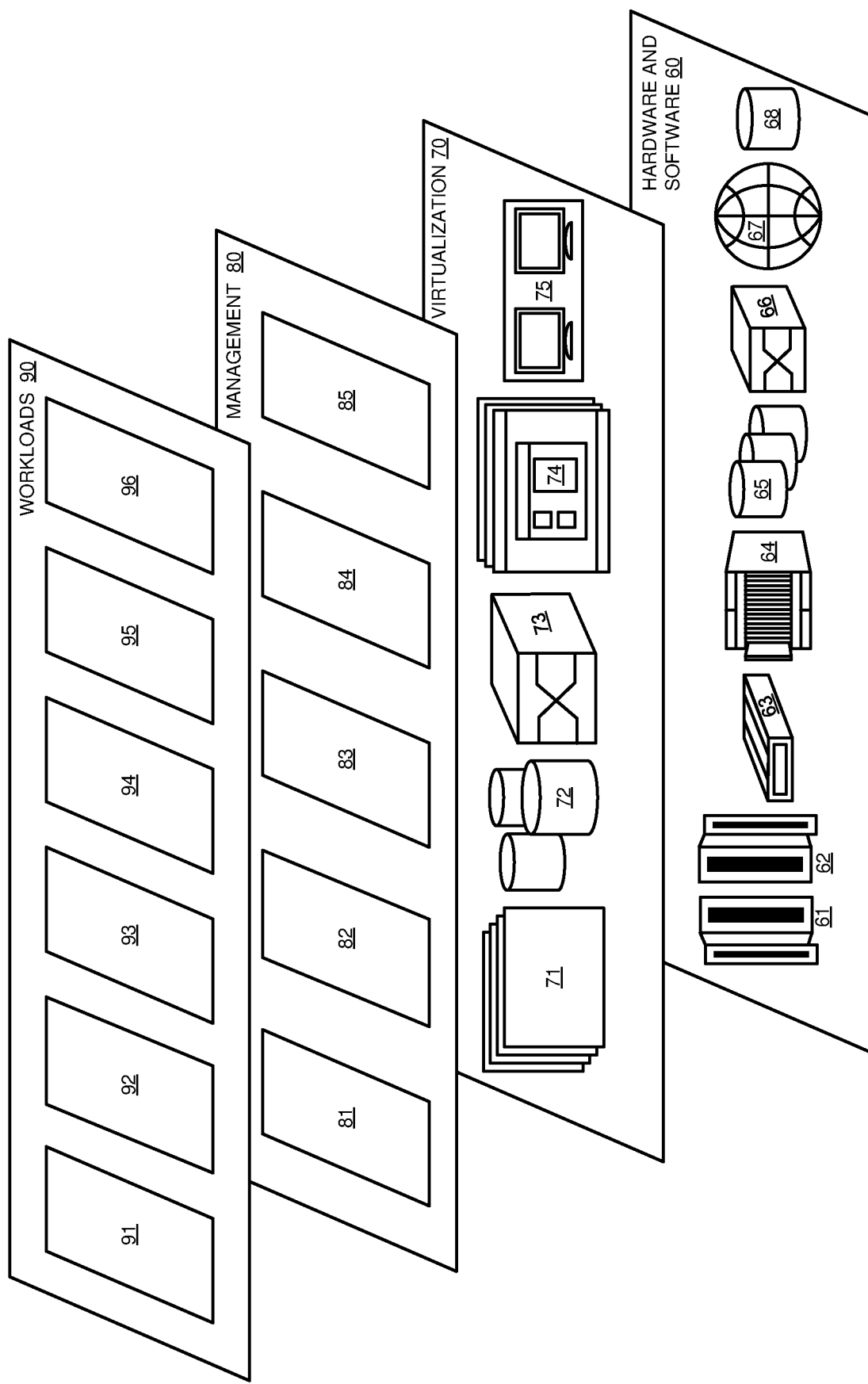
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and in the context of the illustrated embodiments of the present disclosure, various workloads and functions 96 for automated hazard recognition processing. In addition, workloads, and functions 96 for automated hazard recognition processing may include such operations as data analysis and machine learning (e.g., artificial intelligence, natural language processing, etc.), as described herein. In some embodiments, the workloads, and functions 96 for automated hazard recognition processing also works in conjunction with other portions of the various abstraction's layers, such as those in hardware and software 60, virtualization 70, management 80, and other workloads 90 (such as data analytics processing 94, for example) to accomplish the various purposes of the disclosed embodiments.

Figure 3:
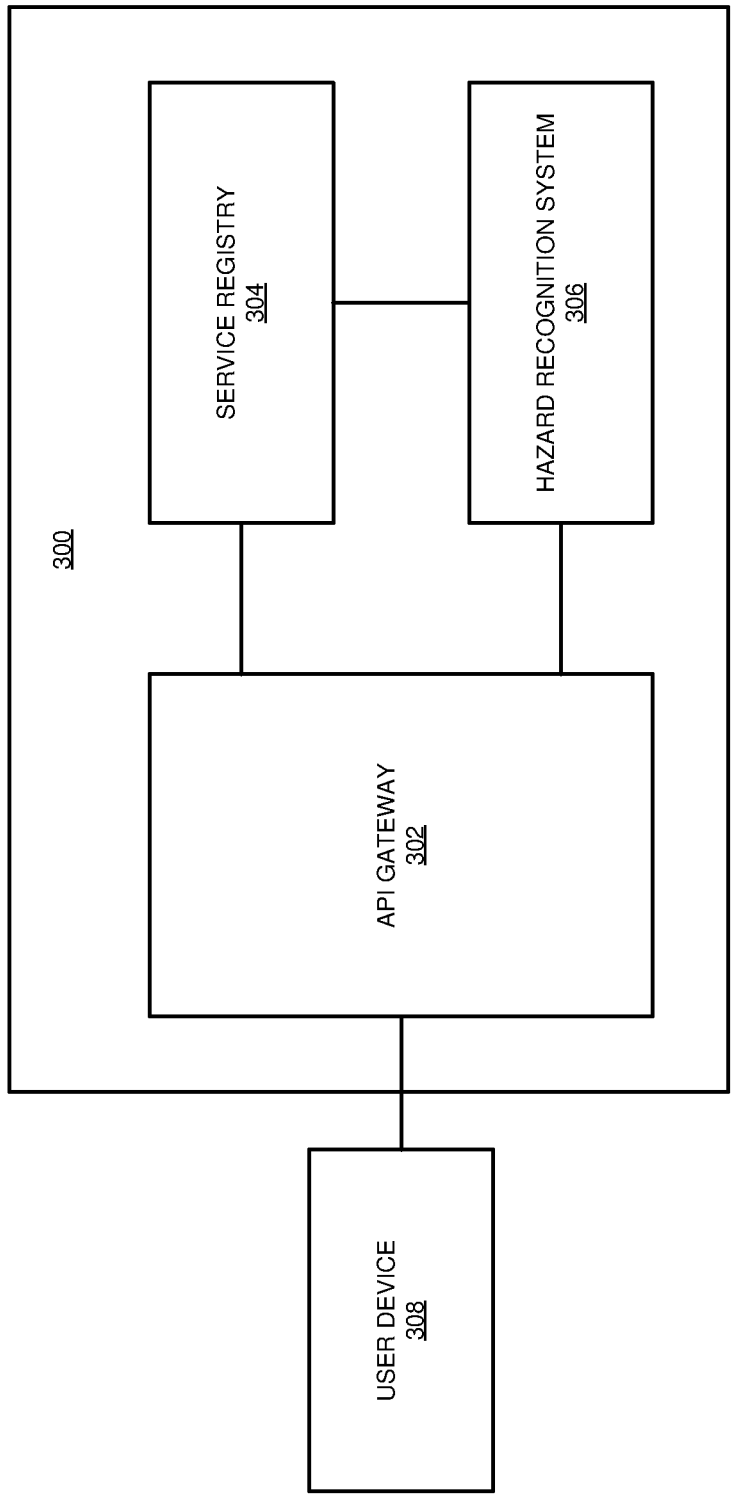
FIG. 3 depicts a block diagram of an example service infrastructure that includes a hazard recognition system in accordance with an illustrative embodiment.

With reference to FIG. 3, this figure depicts a block diagram of an example service infrastructure 300 that includes a hazard recognition system 306 in accordance with an illustrative embodiment. In some embodiments, the hazard recognition system 306 is deployed in workloads layer 90 of FIG. 2. By way of example, in some embodiments, hazard recognition system 306 is implemented as workloads and functions 96 for automated hazard recognition processing.

In the illustrated embodiment, the service infrastructure 300 provides services and service instances to a user device 308. User device 308 communicates with service infrastructure 300 via an API gateway 302. In various embodiments, service infrastructure 300 and its associated hazard recognition system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like hazard recognition system 306. API gateway 302 receives service requests issued by client applications and creates service lookup requests based on service requests. As a non-limiting example, in an embodiment, the user device 308 includes a graphical user interface that depicts at least a portion of a structure graph of a database environment, where nodes of the structure graph represent architectural elements of the database environment and edges of the structure graph represent associations between respective pairs of architectural elements.

In the illustrated embodiment, service infrastructure 300 includes a service registry 304. In some embodiments, service registry 304 looks up service instances of hazard recognition system 306 in response to a service lookup request such as one from API gateway 302 in response to a service request from user device 308. For example, in some embodiments, the service registry 304 looks up service instances of hazard recognition system 306 in response to requests from the user device 308 related to receiving user-submitted aerial images or receiving a user selection, via the graphical user interface, of one or more aerial images for analysis by the hazard recognition system 306.

In some embodiments, the service infrastructure 300 includes one or more instances of the hazard recognition system 306. In some such embodiments, each of the multiple instances of the hazard recognition system 306 run independently on multiple computing systems. In some such embodiments, hazard recognition system 306, as well as other service instances of hazard recognition system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics and selects top-ranking service instances for SGR-related requests. In some such embodiments, in the event that a service instance becomes unresponsive or, unhealthy, the service registry will no longer provide its address or information about this service instance to other services.

Figure 4:
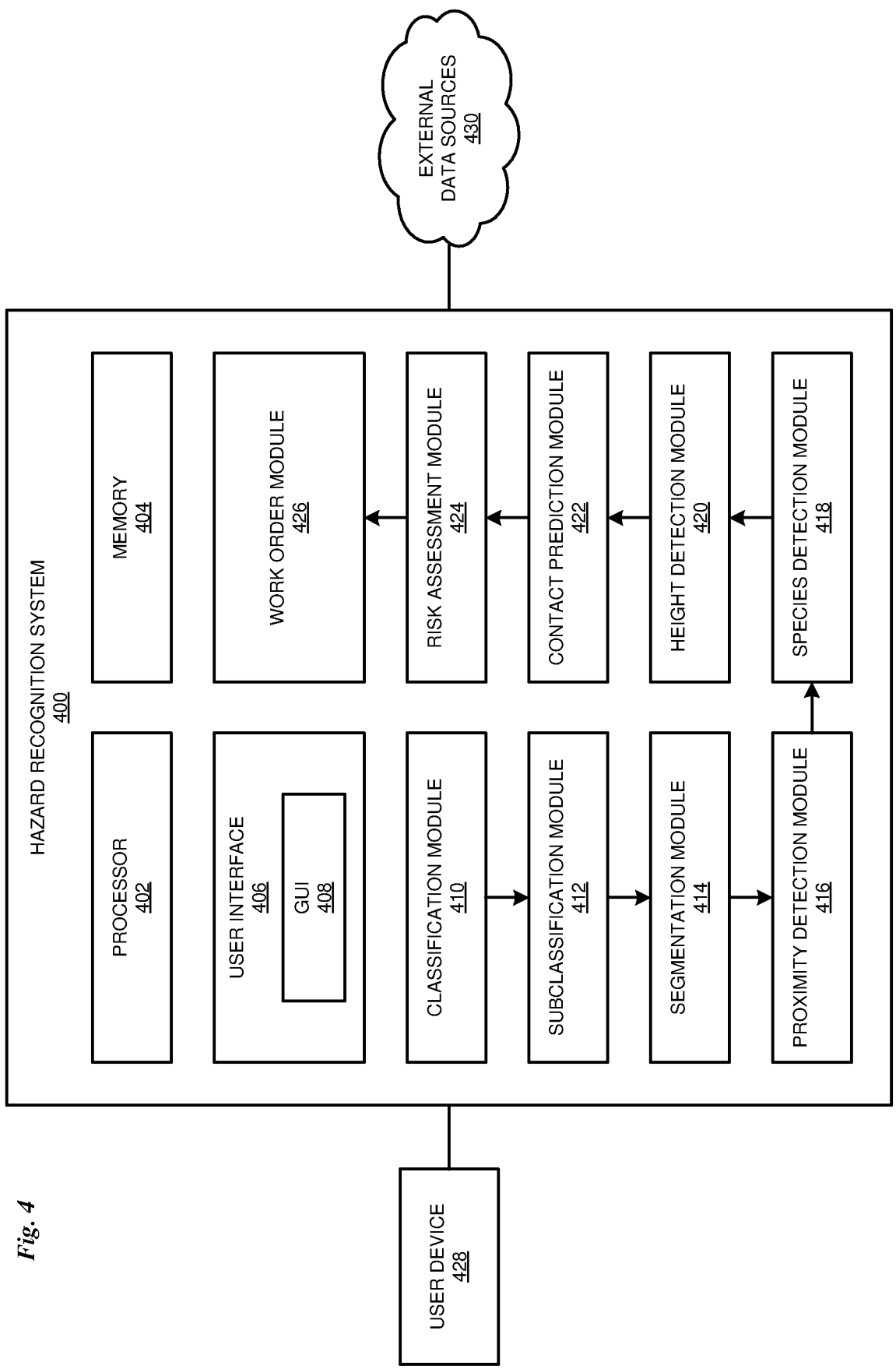
FIG. 4 depicts a block diagram of an example hazard recognition system in accordance with an illustrative embodiment.

With reference to FIG. 4, this figure depicts a block diagram of an example hazard recognition system 400 in accordance with an illustrative embodiment. In a particular embodiment, the hazard recognition system 400 is an example of the hazard recognition system 306 of FIG. 3.

In some embodiments, the hazard recognition system 400 includes a processor 402, memory 404, a user interface 406 that includes a graphical user interface (GUI) 408, a classification module 410, a subclassification module 412, a segmentation module 414, a proximity detection module 416, a species detection module 418, a height detection module 420, a contact prediction module 422, a risk assessment module 424, and a work order module 426. The hazard recognition system 400 receives inputs from, and provides outputs to, a user device 428, which is an example of the user device 308 of FIG. 3. In some embodiments, the hazard recognition system 400 may also utilize one or more external sources of data, collectively shown as external data sources 430. In alternative embodiments, the hazard recognition system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the processing unit ("processor") 402 performs various computational and data processing tasks, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

The user interface 406, which includes a GUI 408 and may further include a command line interface, allows a user to communicate with the hazard recognition system 400 via the user device 428. For example, in some embodiments, the user interface 406 is configured to recognize and take action in response to requests from the user device 428 related to detecting a user selection or submission, via the GUI 408, of one or more aerial images. In some embodiments, a user device 428 may be any known type of computing device, such as a computer, tablet, or smart phone. In some embodiments, the user interface 406 allows communication with the user device 428 via an API gateway (e.g., API gateway 302 of FIG. 3). In some embodiments, the user interface 406 receives one or more user instructions, user settings, user preferences, and/or other user inputs for the hazard recognition system 400.

In some embodiments, the automated hazard recognition system 400 uses the classification module 410 and the subclassification module 412 to analyze a time series of satellite images to establish vegetation on the ground where trees are growing and track changes in the vegetation development in the past and project vegetation growth for the future. For example, in some embodiments, the automated hazard recognition system 400 uses the classification module 410 and the subclassification module 412 to perform a land cover classification process on aerial images to separate different land cover classes. In general, vegetation can be separated from other classes like buildings or roads using spectral information and reflectance of the light. Within the vegetation classes, there are many subcategories that can exist: grassland, trees, agricultural crops, shrubs, etc. Once a subclass like vegetation is separated, that unique class is segmented by the segmentation module 414 to identify individual components (trees, crops, bushes) that can be separated and identified, including overlapping regions (i.e., regions that include a mix of subclasses). As an example, individual trees can be identified within a forest based on the shape and size of canopy extent, where each tree is allocated a certain size or cover.

In some embodiments, the segmentation module 414 identifies a tree canopy based on a spectral gradient where the middle of the canopy has a maximum value of spectral reflection or texture that gradually decreases towards the edges, which will have decreased spectral and texture values as compared to the central maxima. The segmentation module 414 uses transition points, or saddles of change, between neighboring trees to draw a boundary between trees and create a contour line that encloses a feature that has similarities in values within. In some embodiments, the automated hazard recognition system 400 identifies individual trees in the imagery and applies a maximum filling algorithm such that smaller and larger geometrical shapes can fill in the image. In case of trees, it is expected that the geometry will have a roughly circular shape while buildings will have more rectangular shapes. In some embodiments, the automated hazard recognition system 400 gains further insight into the land cover in particular location based on the size and proximity of trees and other objects. In some embodiments, once the segmentation module 414 identifies an object using segmentation, the automated hazard recognition system 400 can further classify objects to separate them based on other characteristics like tree species, crop type, bush categories, etc. detected by the species detection module 418. In some embodiments, the automated hazard recognition system 400 extracts a scaling relation for each object and subclass that reveals the ratio between two-dimensional features and three-dimensional values. In some embodiments, the tree height detection module 420 applies tree height estimates to trees based on two-dimensional canopy diameter calculations.

In some embodiments, tree height detection module 420 applies a geometric scaling factor to individually identified objects where a two-dimensional feature is used to estimate the height of the objects. In order to identify an object, the automated hazard recognition system 400 starts with a two-dimensional aerial image that is acquired at multiple different wavelengths and uses the a classification module 410 and the subclassification module 412 to apply an image classification algorithm as part of a land cover classification process to the aerial image to identify different land cover classes or at least identify vegetation regions and non-vegetation regions. In some embodiments, the classification module 410 and the subclassification module 412 use a machine-learning classification process that is an application of artificial intelligence (AI) technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as image classification.

As used herein, the term "neural network model" can refer to a computer model that can be used by the classification module 410 and/or the subclassification module 412 to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, where data with known outcomes is inputted into the computer model, outputs regarding the data are compared to the known outcomes, and/or the weights of the computer model are autonomously adjusted based on the comparison to replicate the known outcomes. As used herein, the term "training data" can refer to data and/or data sets used to train one or more neural network models. As a neural network model trains (e.g., utilizes more training data), the computer model can become increasingly accurate; thus, trained neural network models can accurately analyze aerial image data with unknown regions, and based on lessons learning from training data, accurately classify regions of aerial images (e.g., as vegetation class or non-vegetation class). Example neural network models that can be used with implementations of the disclosed classification module 410 and sub-classification module 412 include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), Markov chain ("MC"), Hopfield network ("HN"), Boltzmann machine ("BM"), deep belief network ("DBN"), deep convolutional network ("DCN"), convolutional neural network ("CNN"), deconvolutional network ("DN"), deep convolutional inverse graphics network ("DCIGN"), generative adversarial network ("GAN"), liquid state machining ("LSM"), extreme learning machine ("ELM"), echo state network ("ESN"), deep residual network ("DRN"), Korhonen network ("KN"), support vector machine ("SVM"), and/or neural turing machine ("NTM").

Thus, in some embodiments, the automated hazard recognition system 400 identifies one or more different land cover classes in aerial images using a neural network that has been trained using a training data set that includes exemplary images for each class of distinction. In some embodiments, the classification module 410 and the sub-classification module 412 use respective different neural networks to classify regions of aerial images into land cover classes and then into subclasses. For example, in some embodiments, the classification module 410 identifies regions of aerial images that are classified as vegetation class and then and the subclassification module 412 classify portions of the vegetation regions into subclasses, for example, trees, shrubs, crops, etc.

In some embodiments, once the automated hazard recognition system 400 identifies the classes and subclasses, the segmentation module 414 identifies objects within the boundaries of classified regions. In some embodiments, the segmentation module 414 identifies individual objects in each region or in one or more regions having a specified class or subclass. For example, in some embodiments, the automated hazard recognition system 400 identifies individual objects in each region classified as being in one of the subclasses of the vegetation class, or as being in a trees subclass of the vegetation class. In some embodiments, the segmentation module 414 identifies individual objects by analyzing the dimensions, orientation, or symmetry of the objects, and segmenting the images on parameters that are characteristic to the corresponding regions, such as the extent of the canopy of trees based on age and climate. In one example, the segmentation module 414 identifies a region of an aerial image as being in the vegetation class and in the forest subclass, and then identifies individual trees in the identified forest region.

In some embodiments, the proximity detection system 416 determines a canopy diameter for each identified tree and verifies that it is not overlapping with adjacent trees or other regions. In some embodiments, the proximity detection system 416 first verifies that a tree's canopy is at least somewhat circular in shape before measuring the canopy diameter. In some embodiments, the proximity detection system 416 verifies that a tree's canopy is at least somewhat circular by measuring the circularity of the tree's canopy and comparing the result to a threshold value indicative of a minimum level of circularity. In some embodiments, the proximity detection system 416 measures circularity using an area-to-perimeter ratio, for example as shown as Expression (1):

$$C = \frac{4\pi A}{P^2} \quad (1)$$

In Expression (1), C represents circularity, P is the convex perimeter (the perimeter of the convex hull that encloses the canopy), and A is the area. For a perfect circle, C=1. As the shape of the canopy gets less circular, the value of C decreases. As the canopy gets less circular, the value of C gets lower. Thus, a threshold value for circularity can be set between 0 and 1 depending on how much shape irregularity is acceptable. In an alternative embodiment, circularity C can be the reciprocal of Expression (1), in which case the perfectly circular canopy has C=1 and C increases as the canopy gets less circular.

In some embodiments, the height detection module 420 estimates the tree height using height-to-width scaling data. In some embodiments the height-to-width scaling data is a general scaling that is established for all species of trees. In some embodiments, the species detection module 418 further classifies trees into individual tree species where the spectral and texture information is used to create one or multiple subclasses that have tree species identified for the respective regions. For example, in some embodiments, the species detection module 418 uses a binary classification algorithm to classify trees as perennial or deciduous based on greenness detected during late autumn-winter-early spring. While the species detection module 418 carries out classification at individual tree level in the above description, alternatively the automated hazard recognition system 400 can perform classification for a larger area that contains multiple trees from the same species.

Once the individual tree species have been identified, the height detection module 420 determines the height of each tree. In some embodiments, the height detection module 420 calculates a maximum diameter across the crown of the tree (also known as a maximum crown spread measurement), where the crown refers to the mass of foliage and branches growing outward from the trunk of the tree. Unless otherwise indicated, the term "crown diameter" as used herein refers to maximum diameter across the crown of a tree. The height detection module 420 measures crown diameter by measuring the maximum width of the crown along any axis that extends parallel to the ground from a point on the dripline on one side of the tree to another point on the dripline on the opposite side of the tree, where dripline refers to the outer boundary to the area located directly under the outer circumference of the tree's crown.

To determine the tree height, the height detection module 420 extrapolates a three-dimensional height from the two-dimensional aerial image. In general, the height of a tree is related to diameter of the crown of the tree according to a statistical relationship that varies depending on the species of the tree. The statistical relationship can be described as an allometric relationship (or allometric equation) in which the crown diameter varies with tree height according to a pair of allometric constants—the allometric coefficient and the allometric offset. The allometric coefficient and allometric offset constants vary according to the species of the tree.

In some embodiments, the automated hazard recognition system 400 may be evaluating a set of aerial images taken of different areas within a particular ecoregion such that the diversity and characteristics of tree species can be expected to be constant in the set of images. In some such embodiments, tree heights for trees in a subset of the set of aerial images is measured using known techniques for measuring tree height using a Light Detection and Ranging (LIDAR) system. The tree heights collected using LIDAR are then grouped according to tree species, and linear regression is applied to the LIDAR data to derive allometric constants each tree species.

In alternative embodiments, the automated hazard recognition system 400 has access to vegetation data stored at external data sources 430 and/or memory 404 that may be used to calculate tree height from crown diameter. For example, allometric equations are known and are publicly available that provide for extrapolation and estimation of various dendrometric quantities, including the statistical relationship between tree height and crown diameter on a species-by-species basis. In some embodiments, the automated hazard recognition system 400 has access to such data.

Table 1 (above) shows an example of data collected by LIDAR or from another data source that includes allometric constants for several tree species. In some embodiments, the height detection module 420 uses the data in Table 1 with an allometric equation such as Expression (2) (above and shown again below) to estimate tree height from crown diameter:

$$H = \frac{D - I}{S} \quad (2)$$

In Expression (2), H is the tree height and D is the crown diameter. The crown diameter is calculated as described above. Also, S is an allometric coefficient and I is an allometric offset, examples of which are shown in Table 1, where S and I are specific to the species of the tree being measured.

Additional parameters provide more accurate predictions towards a tree height. These parameters include but are not limited to local weather and climate patterns, soil composition, elevation, geographical area, and surrounding vegetation. In some embodiments, the height detection module 420 can access textual and image data from additional resources such as social media, crowdsource gathered data, weather reports, scientific journals, and technical reports to improve tree height prediction. In some embodiments, the height detection module 420 contains or has access to a library of tree heights in relation to species and crown diameter. The additional parameters can be associated with respective weight values to adjust the predicted tree heights.

Once the automated hazard recognition system 400 has established allometric constants for scaling for all tree species detected in the imagery, the height detection module 420 uses the allometric constants to calculate tree heights. In some embodiments, each tree delineated is first associated with a tree species, then the crown diameter of each tree is calculated, and then an allometric constant is applied to determine a height of each tree. This is applied systematically for all trees that are detected in the imagery. In case the tree is not identified to belong to any particular species, the mean of the two dominant species in the ecoregion or in the set of aerial images under evaluation will be used.

In some embodiments, the contact prediction module 422 retrieves, for each tree, a height of the nearest power line and determines a likelihood that the tree contacts that power line based on the height of the tree, the diameter of the crown of the tree, and the height of the power line. The risk assessment module 424 then determines an amount of risk posed by each tree using tree height and proximity to power lines in aerial image.

In some embodiments, risk assessment module 424 performs a risk analysis on each tree. The risk analysis can take into consideration the proximately to the nearest power line, tree species, soil quality, wind effects, and overall dryness of the environment. Using these and any other appropriate inputs, a risk value can be determined for each tree.

For example, one such risk factor is tree height and position in relation to the power line. If the tree height is higher than the distance to the power line, a strong wind can cause the tree can fall into the power line. A risk assessment module 424 can predict a risk value on a matrix composed in part of parameters including tree height, weather patterns, climate patterns, tree health, and proximity to the power line. In other embodiments, the risk value is based in part on the parameters including tree height, weather patterns, climate patterns, tree health, and proximity to the power line and determined by various statistical methods. The risk assessment module 414 also has access to heights of power lines, either by having access to the actual heights or having stored values of general heights of power lines. The risk assessor can also have access to soil characteristics and recent weather patterns. The ability of a tree to withstand a strong wind decreases in wet and sandy soil. As a result, the risk value can be either a static risk number or it can change dynamically in response to weather or climate changes.

The risk assessment module 424 is also equipped with predictive functionality. For example, the risk assessor can use the tree species, height, environment to predict tree growth. The risk assessment module 424 can then use the estimated tree growth to forecast a risk value of each tree for given time intervals. For example, the risk assessment module 424 can give a six month, a one year, and a two-year forecasted risk value. In some embodiments, a user can request a risk value for a custom time range or point. For example, for budgeting purposes, a municipality may want to predict the number of workers required to maintain vegetation over a fiscal year. The municipality could use the forecasted risk values to determine the number of workers needed.

The risk score can be normalized to fit within a specified range. The normalized risk score can be further broken down into risk classes based upon a threat level of damage and the potential impact to the environment and customers. For example, if the system 200 detects dry or arid conditions, the risk score can be classified as an extreme threat to cause harm to the environment through fire. In another example, if the power line is transmitting power to a grid powering a hospital or other emergency service provider, the risk class can reflect an elevated probability of injury to life. The risk assessment module 424 can also order the trees based on risk values to create a prioritized list of trees that need to be maintained. In addition to individual trees, the risk assessment module 424 can groups trees together and provide an overall risk value for each group. These group risk values can also be prioritized to provide a user a list of locations that need to be addressed quicker to reduce any hazards.

The risk assessment module 424 can also be coupled with machine learning functionality to learn from acquired data. Artificial neural networks (ANNs) can be used to estimate height, predict tree fitness, and determine risk values. Other types of artificial intelligence models can be used including but not limited to decision trees, decision tables, support vector machines, clustering models, hidden Markov models, and Gaussian mixture models.

If the risk score is above a threshold amount, the risk assessment module 424 can transmit a request to a work order module 426 to initiate maintenance on the hazardous tree. The work order module 426 can issue a work order for a specific tree or group of trees at a target location. The work order module 426 can also store an expected finish date for the order. To verify that work has been completed, the hazard recognition system 400 can request new images of the target location and reinitiate the process. Once a new risk value is determined for the target location, the hazard recognition system 400 can determine if the risk value has decreased below a threshold amount or if a second work order needs to be issued for the target location.

In some embodiments, after identifying each tree's risk value, the risk assessment module 424 creates a map of the target location. The map can include a visual indication of the power line locations and the potentially hazardous trees. The map can also include visual markers to distinguish between high-risk trees and low risk trees. For example, the trees can be visually highlighted, for example by showing the highest risk values being marked in red and the lowest risk values being marked in blue. In other embodiments, the risk value differences can be notated by shapes or numbers. The map can also be generated using predictive analytics to show predicted risk values at some future date or dates.

In some embodiments, the risk value can be compared to a threshold value. If the risk is below the threshold value, no further action needs to be taken. If, however, the risk value is greater than a threshold value, a work order can be generated by the work order module 426. The work order can direct a crew to the target location to remove the tree hazard. The work crew can remove the tree hazard by removing the tree or pruning the tree. The work order can also include an expected finish date. Once the expected finish date has passed, a new image or set of images can be retrieved and the analysis can be performed again to determine if the risk value has decreased below the threshold amount.

In some embodiments, the work order module 426 generates one or more work order(s) and/or updates a risk map. In some embodiments, the process generates a work order for each tree having a risk value that is above a threshold risk tolerance. In some embodiments, the risk map includes a map of power lines and indications of locations of trees having a risk value that is above a threshold risk tolerance.

In some embodiments, the work order module 426 generates work orders for current hazards are set to be high priority and work orders that are created for future hazards are initially set to be low priority. In some such embodiments, low priority work orders may automatically be pushed back in the queue to allow a high priority work order in its place so that the high priority work order will be completed before the low priority work order. In some such embodiments, a low priority work order is automatically converted into a high priority work order when it is a threshold amount of time before it is predicted to become a current hazard. As an example, a particular tree may be detected and the species and size identified, and based on known growth rate for that species, the system predicts that the tree will become a current hazard in two years. The work order is initially set to a low priority. However, if the threshold amount of time for priority escalation is set to one year and a year goes by without it being removed, the work order will be one year away (equal to the threshold amount of time) from becoming a present hazard, so the priority is escalated to high priority.

Figure 5:
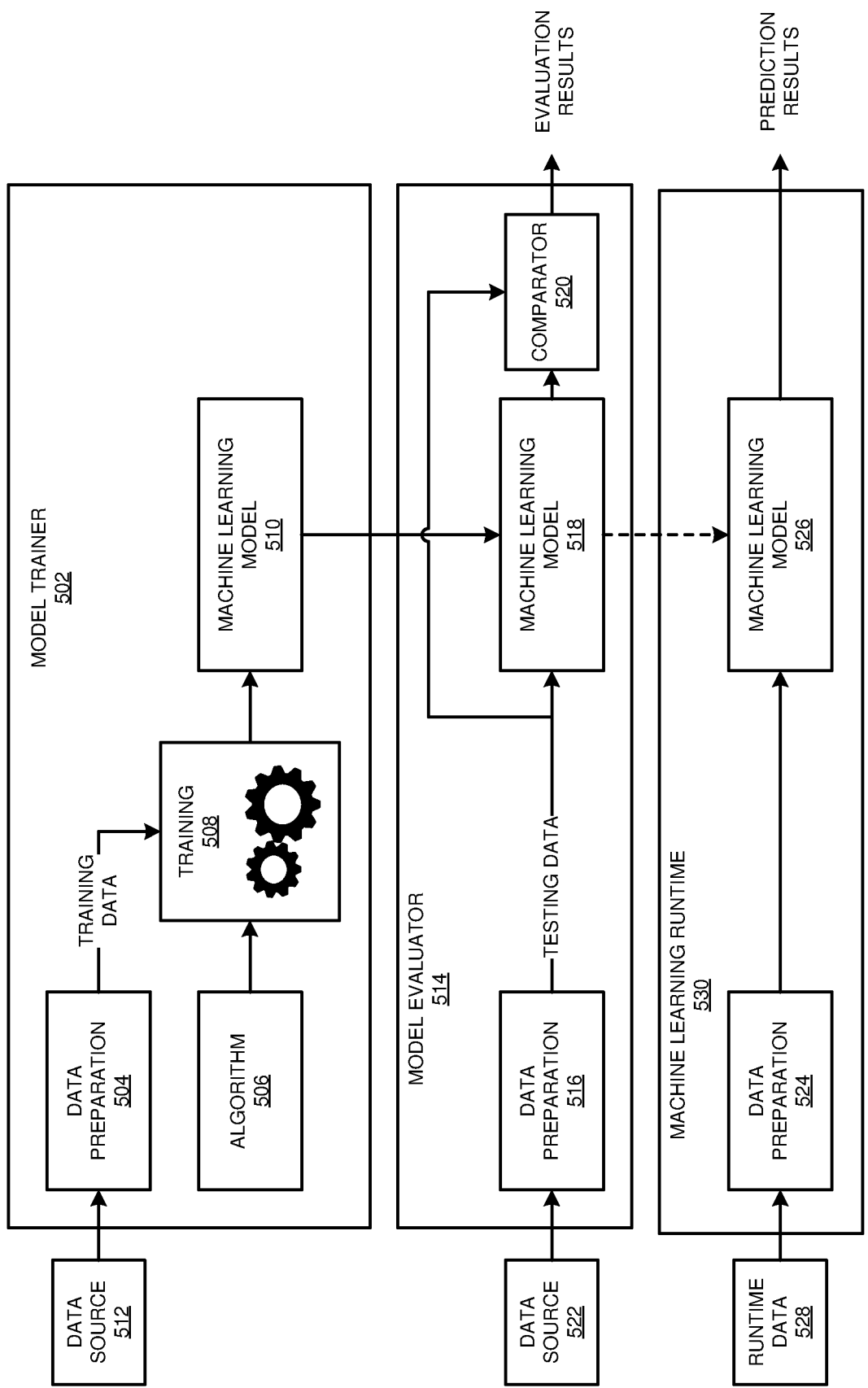
FIG. 5 depicts a block diagram of an example machine learning environment in accordance with an illustrative embodiment.

With reference to FIG. 5, this figure depicts a block diagram of an example machine learning environment 500 in accordance with an illustrative embodiment. In the illustrated embodiment, the machine learning environment 500 is an example of the classification module 410 or the subclassification module 412 of FIG. 4. The machine learning environment 500 includes a model trainer 502, a model evaluator 514, and a machine learning runtime module 530. In alternative embodiments, the machine learning runtime module 530 is included in the classification module 410 or the subclassification module 412, but the model trainer 502 and the model evaluator 514 are not included in the hazard recognition system 400 and the machine learning models are trained and evaluated elsewhere before being included in the machine learning runtime module 530.

In the illustrated embodiment, the model trainer 502 includes a data preparation module 504, algorithm module 506, training module 508, and machine learning model 510. In the illustrated embodiment, the model evaluator 514 includes a data generation module 516, trained machine learning model 518, and comparator 520. In the illustrated embodiment, runtime environment 530 includes a data preparation module 524 and machine learning model 526. In alternative embodiments, the model trainer 502, model evaluator 514, and runtime environment 530 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the model trainer 502 generates a machine learning model 510 based on an algorithm provided by algorithm module 506. In an embodiment, the algorithm module 506 selects the algorithm based on one or more known machine learning algorithms. In an embodiment, model trainer 502 includes a training module 508 that trains the machine learning model 510 using training data from a data source 512. For example, in some embodiments, the training data (and testing data) includes a plurality of training images for each of a plurality of candidate land cover classes of variation and each comprising a respective classification label indicating a correct land cover class for the associated training image.

In some embodiments, the training data, testing data, and runtime data are pre-processed by a respective data preparation module 504, 516, 524. In some such embodiments, the data preparation modules 504, 516, 524 structure the data to make best use of the machine learning model 510. Embodiments of the data preparation modules 504, 516, 524 use one or more known image enhancement heuristics.

In an embodiment, the training module 508 trains the machine learning model 510 using training data appropriate for the current domain being modeled. For example, in an embodiment, the machine learning model 510 is a neural network configured to operate as an image classification module.

In an embodiment, the model evaluator 514 receives the trained machine learning model 518, which is trained (or re-trained), and is thereby an updated version of the machine learning model 510. In some embodiments, the model evaluator 514 evaluates the classification output of the updated machine learning model 518 using the comparator 520 to compare the output of the machine learning model 518 to the actual ground truth value, and generates an evaluation In some embodiments, the runtime environment 530 receives the evaluated machine learning module 526. In some embodiments, the runtime environment 530 may be local to the model evaluator 514 and model trainer 502, while in alternative embodiments, the runtime environment 530 may be remotely located (e.g., located on a remote server connected via a network connection to the model evaluator 514 and model trainer 502).

In some embodiments, the runtime environment 530 uses the machine learning model 526 to infer and make predictions about the input runtime data 530. Actual implementations of the runtime environment 530 may be utilized as the classification module 410 and/or the subclassification module 412 of FIG. 4.

Figure 6:
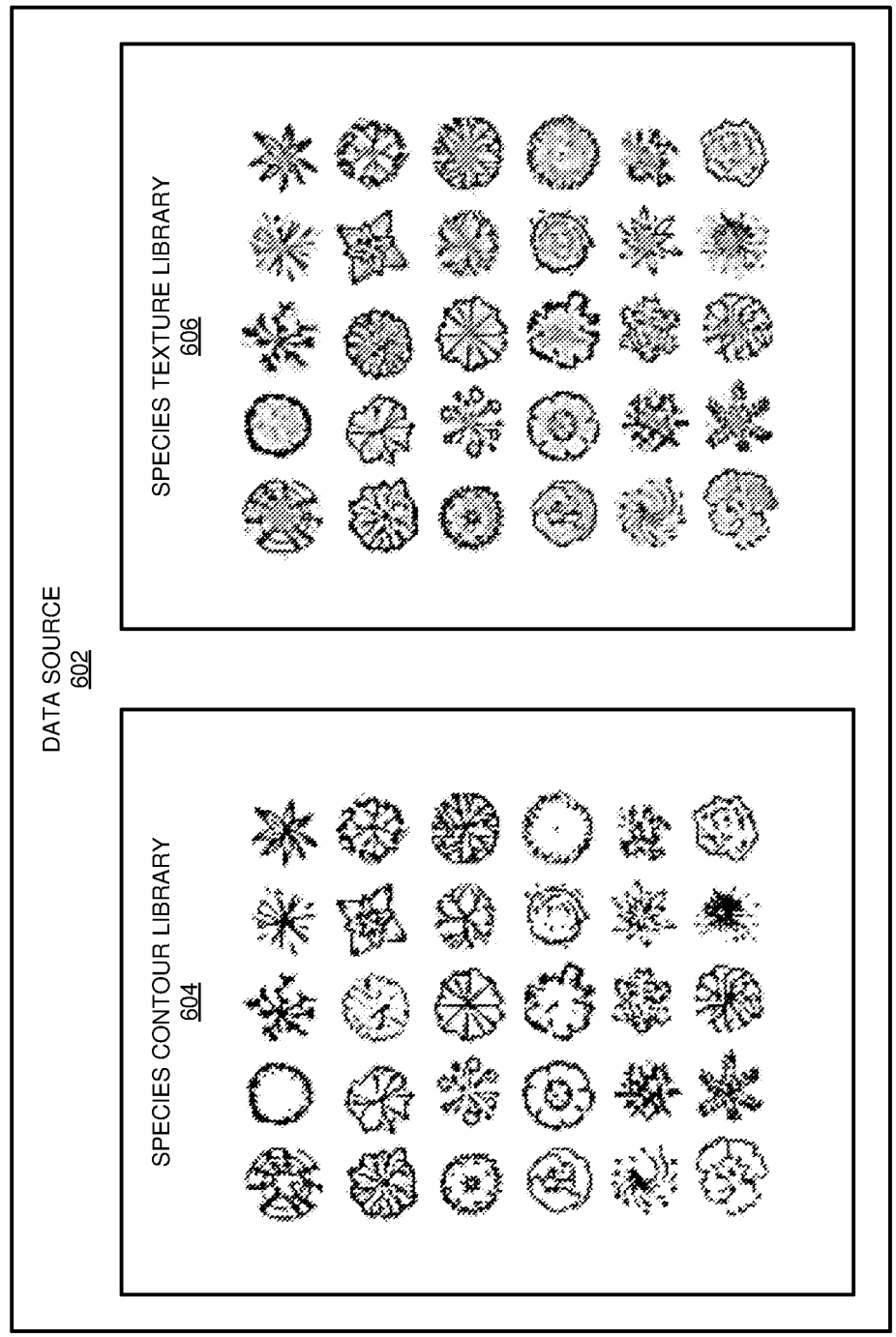
FIG. 6 depicts a block diagram of an example data source in accordance with an illustrative embodiment.

With reference to FIG. 6, this figure depicts a block diagram of an example data source 602 in accordance with an illustrative embodiment. In a particular embodiment, the data source 602 is a portion of the memory 404 of FIG. 4 and/or one or more external data sources 430 of FIG. 4.

In the illustrated embodiment, the example data source 602 includes one or both of a species contour library 604 and a species texture library 606. In some embodiments, the species contour library 604 comprises images of shapes of typical contour lines for various species of trees. In some embodiments, the contour lines in the contour library 604 are used as candidate contour lines that are overlaid on contour lines in an aerial image to allow for comparison. In some embodiments, the overlaying of each candidate contour line includes calculating centers of the contour line and the candidate contour line. In some such embodiments, the candidate contour line is then aligned with the contour line by aligning the respective calculated center points. In some embodiments, the comparison is then performed by calculating an overall distance value between the contour line in the aerial image and the candidate contour line from the contour library 604 according to a plurality of local distance values calculated between points on the contour line and points on the candidate contour line. In alternative embodiments, the comparison is performed by calculating an average deviation between corresponding points on the contour line in the aerial image and the candidate contour line from the contour library 604. In some such embodiments, the candidate contour line is then rotated relative to the contour line (or vice versa, or both are rotated relative to the other) and distance and/or deviation between the two lines are determined for a plurality of relative rotational positions until a best fit is determined for each candidate contour line, where the best fit results in the smallest overall distance or deviation value. In some such embodiments, the best fit distance and/or deviation value for each respective candidate contour line is then used as the basis for comparison with other candidate contour lines.

In some embodiments, the species texture library 606 comprises images of shapes and texture patterns that are typical for various species of trees. In some embodiments, the texture patterns in the species texture library 606 are used as candidate texture patterns that are compared to texture patterns in an aerial image. In some embodiments, the comparison is performed using various pixel mapping and comparison techniques, for example edge detection or gradient mapping can be applied to the texture pattern from the aerial image and to the candidate texture pattern from the species texture library 606. The resulting pattern or pixel maps can then be compared, for example by comparison of pixel values, to calculate an overall difference or degree of similarity. In some embodiments, a portion of an aerial image depicting a tree is compared to a plurality of the candidate contour lines in the species contour library 604 and/or a plurality of candidate texture patterns from the species texture library 606 in order to determine which candidate contour line and/or candidate texture pattern most closely matches the portion of the aerial image. The species contour library 604 and species texture library 606 associate the candidate contour line and/or candidate texture pattern that most closely match with particular tree species, which can then be used as a factor in determining the species of the tree depicted in the aerial image.

Figure 7:
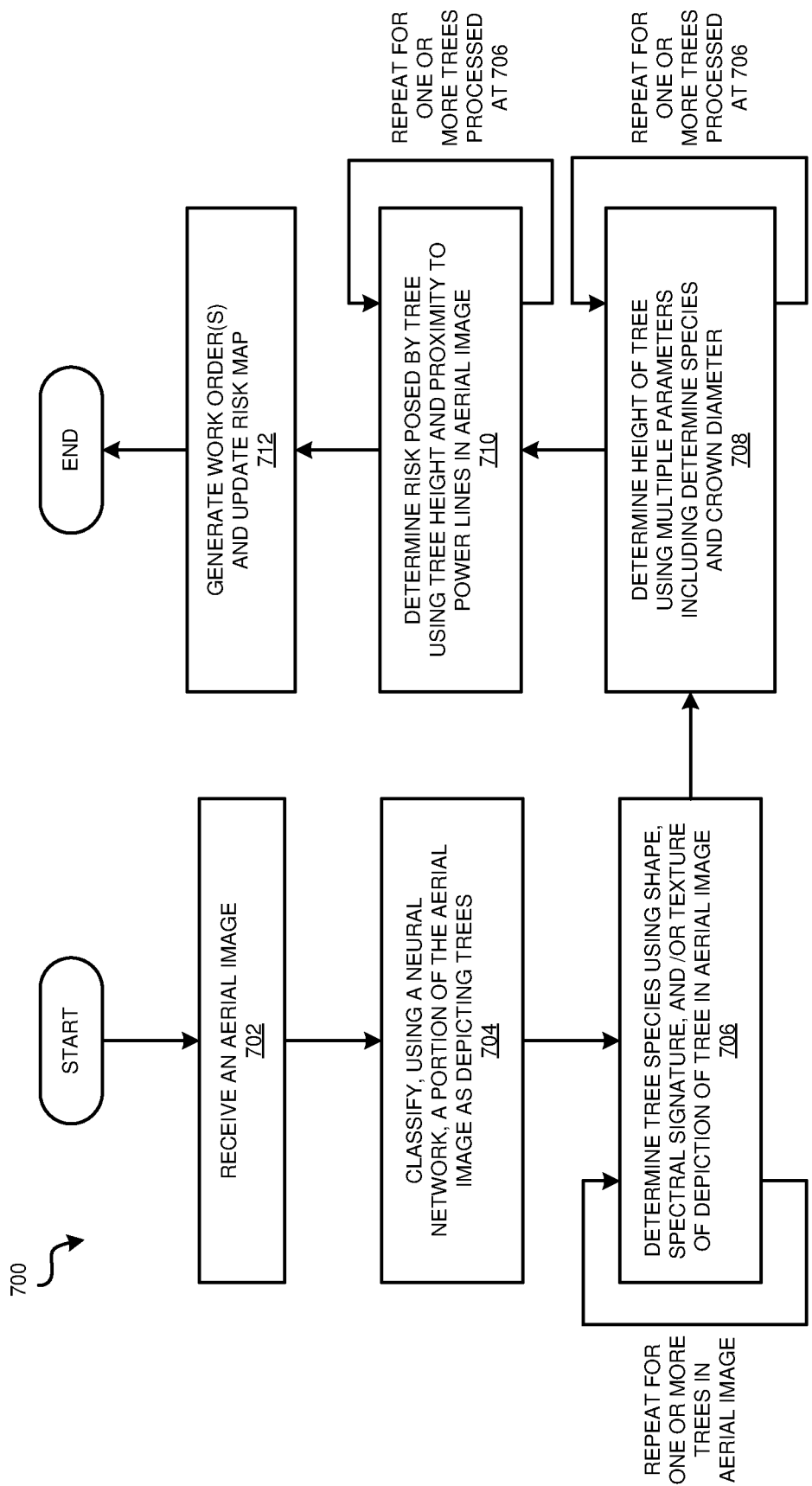
FIG. 7 depicts a flowchart of an example process for automatic hazard recognition in accordance with an illustrative embodiment.

With reference to FIG. 7, this figure depicts a flowchart of an example process 700 for automatic hazard recognition in accordance with an illustrative embodiment. In a particular embodiment, the hazard recognition system 306 of FIG. 3 or the hazard recognition system 400 of FIG. 4 carries out the process 700.

In an embodiment, at block 702, the process receives an aerial image. Next, at block 704, the process classifies, using a neural network, a portion of the aerial image as depicting trees. In some embodiments, the neural network is a machine-learning image classification model trained such that the image classification model classifies images or portions of images according to the type of land cover that is depicted (e.g., forest, herbaceous/grassland, shrubland, developed, agriculture, wetlands, etc.). In some embodiments, the process uses the machine-learning image classification model to classify the portion of the aerial image in one of a plurality of possible land cover classes. For example, in some embodiments, the portion of the aerial image depicts a forested region that the machine-learning image classification model identifies as a predicted land cover class corresponding to a vegetation type of land cover. In some embodiments, the process uses two or more image classification models that output successively more specific classifications of inputted images. For example, in an exemplary embodiment, a first machine-learning image classification model may classify a portion of an image in a "vegetation" class, and then that portion of the image is further classified by a second image classification model into a subclass of "forest" or "trees." In some such embodiments, the second image classification model is specifically limited to assigning subclasses to portions of images that have been classified as "vegetation." Thus, for example, the first image machine-learning image classification model may classify another portion of an image in an "urban developed" class, and then that portion of the image is further classified by a third image classification model into a subclass of "houses." In some such embodiments, the third image classification model is specifically limited to assigning subclasses to portions of images that have been classified as "urban developed."

Next, at block 706, the process determines tree species using shape, spectral signature, and/or texture of depiction of tree in aerial image. In some embodiments, the process at block 706 includes segmenting the portion of the inputted image using edge-detection processing resulting in a contour line that defines one or more perimeters of respective trees depicted in the portion of the inputted image. In some embodiments, the edge-detection processing includes detecting a plurality of gradients and respective gradient directions in the portion of the image depicting the trees being evaluated. The process can detect the gradients by comparing intensity values of neighboring pixels in the portion of the inputted aerial image, and then detect edge pixels by locating the pixels in valleys between opposing gradients. In some embodiments, the process determines, for each tree, whether the tree is within a buffer distance from a power line by determining a distance between a depiction of the power line in the aerial image and a point on the tree's contour line. In some embodiments, the process determines the species of each of the trees by comparing each tree's contour line to candidate contour lines corresponding to respective different species of trees. For example, in some embodiments, the process compares the contour line to each candidate contour lines by overlaying one of the candidate contour lines on the contour line and calculating an overall distance value between the contour line and the candidate contour line according to a plurality of local distance values calculated between points on the contour line and points on the candidate contour line. In some embodiments, the candidate contour lines are limited to contour lines for trees that are common to an ecoregion in which the portion of an inputted aerial image is located. In some embodiments, the process calculates crown diameters of each of the tree crowns using the contour lines of the respective trees.

Next, at block 708, the process determines the height of each tree using multiple parameters, for example the respective species and crown diameter of each tree may be used as the parameters. In some embodiments, the process calculates the height of a tree using the diameter of the crown of the tree and an allometric coefficient for the species of the tree. In some embodiments, the process derives allometric coefficients by measuring heights and crown diameters of a plurality of trees in an ecoregion in which the portion of an inputted aerial image is located, then grouping the measured heights and crown diameters by species, and then applying linear regression to heights and crown diameters of each species to derive allometric coefficients for each species.

In some embodiments, the process retrieves, for each tree, a height of the nearest power line and determines a likelihood that the tree contacts that power line based on the height of the tree, the diameter of the crown of the tree, and the height of the power line. Next, at block 710, the process determines an amount of risk posed by each tree using tree height and proximity to power lines in aerial image. In some embodiments, the process calculates a risk value for each tree based on the likelihood that the tree contacts the power line. Next, at block 712, the process generates one or more work order(s) and/or updates a risk map. In some embodiments, the process generates a work order for each tree having a risk value that is above a threshold risk tolerance. In some embodiments, the risk map includes a map of power lines and indications of locations of trees having a risk value that is above a threshold risk tolerance.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   identifying, by a processor, a tree type of vegetation depicted by a portion of an inputted aerial image;
   segmenting, by the processor, the portion of the inputted image resulting in a contour line that defines a perimeter of a tree and shape characteristics depicted in the portion of the inputted image;
   detecting, by a processor, that the tree is within a buffer distance from a power line by determining a distance between a depiction of the power line in the aerial image and a point on the contour line;
   determining, by the processor, a species of the tree by comparing the contour line to candidate contour lines corresponding to respective different species of trees, the comparing comprising calculating a center point of the contour line, aligning the center point with a first center point of a first contour line from the candidate contour lines, and calculating an average deviation between a point on the contour line and a first point on the first contour line;
   calculating, by the processor, a shape and a diameter of a crown of the tree using the contour line;
   estimating, by the processor, a height of the tree based on the species of the tree and the diameter of the crown of the tree;
   calculating, by the processor, a risk value for the tree based on a risk of contact between the power line and the tree; and
   issuing, by the processor, a work order to maintain the tree to prevent contact with the power line based on the risk value.

2. The computer-implemented method of claim 1, wherein the identifying of the tree type of vegetation comprises identifying a vegetation land cover class depicted by the portion of the inputted aerial image using a first image classification model,
   wherein the first image classification model is a first machine-learning model trained such that the first image classification model identifies the vegetation land cover class from among a plurality of candidate land cover classes of variation.

3. The computer-implemented method of claim 2, further comprising:
   training, by the processor, the first image classification model to distinguish between the plurality of candidate land cover classes of variation using a plurality of training images each comprising a respective classification label indicating a correct land cover class for the associated training image.

4. The computer-implemented method of claim 3, further comprising:
   verifying that the tree has been maintained as set forth in the work order to prevent contact with the power line by analyzing a second aerial image that is acquired after the work order was issued; and
   recording, responsive to verifying that the tree has been maintained as set forth in the work order, in a database that a hazard posed by the tree has been removed.

5. The computer-implemented method of claim 2, wherein the identifying of the tree type of vegetation further comprises identifying a tree type land cover subclass of the vegetation land cover class, wherein the tree type land cover subclass corresponds to the tree type of vegetation depicted by the portion of the inputted aerial image.

6. The computer-implemented method of claim 5, wherein the identifying of the tree type land cover subclass comprises using a second image classification model, wherein the second image classification model is a second machine-learning model trained such that the second image classification model identifies the tree type land cover subclass from among a plurality of candidate land cover subclasses of variation.

7. The computer-implemented method of claim 1, wherein the segmenting of the portion of the inputted image comprises using edge-detection processing.

8. The computer-implemented method of claim 7, wherein the edge-detection processing comprises detecting a plurality of gradients and respective gradient directions by comparing intensity values of pixels in the portion of the inputted aerial image and detecting edge pixels according to the plurality of gradients and respective gradient directions.

9. The computer-implemented method of claim 1, wherein the comparing of the contour line to candidate contour lines comprises:
   overlaying one of the candidate contour lines on the contour line; and
   calculating an overall distance value between the contour line and the thus overlaying candidate contour line according to a plurality of local distance values calculated between points on the contour line and points on the candidate contour line.

10. The computer-implemented method of claim 1, further comprising:
retrieving the candidate contour lines from a computer readable storage medium that stores a library of candidate contour lines associated with respective tree species.

11. The computer-implemented method of claim 10, wherein the retrieving of the candidate contour lines from the computer readable storage medium comprises selecting the candidate contour lines from among the library of candidate contour lines according to an ecoregion in which the portion of an inputted aerial image is located.

12. The computer-implemented method of claim 1, wherein the estimating of the height of the tree comprises calculating the height of the tree using the shape of the contour, circularity of the crown, and diameter of the crown of the tree and an allometric coefficient for the species of the tree.

13. The computer-implemented method of claim 12, further comprising:
measuring heights and diameters of crowns of a plurality of trees in an ecoregion in which the portion of an inputted aerial image is located;
grouping the measured heights and diameters of the crowns by species; and
applying linear regression to heights and crown diameters of each species to derive allometric coefficients for each species.

14. The computer-implemented method of claim 1, wherein the species is further determined according to spectral characteristics and texture of the portion of the inputted aerial image.

15. The computer-implemented method of claim 1, wherein the segmenting of the portion of the inputted image comprises using segmentation processing.

16. The computer-implemented method of claim 1, further comprising calculating, by the processor, a flammability of the tree and a circularity of a crown of the tree using the contour line.

17. The computer-implemented method of claim 1, further comprising:
rotating the contour line relative to the first contour line, the rotating producing a minimized average deviation;
determining the first contour line to be a best fit of the contour line responsive to determining that the minimized average deviation is less than a second minimized average deviation corresponding to a second contour line from the candidate contour lines; and
selecting, responsive to the best fit, a first species corresponding to the first contour line as the species of the tree.

18. A computer program product, the computer program product comprising one or more computer readable storage media, and program instructions collectively stored on the one or more computer readable storage media, the program instructions executable by one or more processors to cause the one or more processors to perform operations comprising:
identifying, by a processor, a tree type of vegetation depicted by a portion of an inputted aerial image;
segmenting, by the processor, the portion of the inputted image resulting in a contour line that defines a perimeter of a tree and shape characteristics depicted in the portion of the inputted image;
detecting, by a processor, that the tree is within a buffer distance from a power line by determining a distance between a depiction of the power line in the aerial image and a point on the contour line;
determining, by the processor, a species of the tree by comparing the contour line to candidate contour lines corresponding to respective different species of trees, the comparing comprising calculating a center point of the contour line, aligning the center point with a first center point of a first contour line from the candidate contour lines, and calculating an average deviation between a point on the contour line and a first point on the first contour line;
calculating, by the processor, a shape and a diameter of a crown of the tree using the contour line;
estimating, by the processor, a height of the tree based on the species of the tree and the diameter of the crown of the tree;
calculating, by the processor, a risk value for the tree based on a risk of contact between the power line and the tree; and
issuing, by the processor, a work order to maintain the tree to prevent contact with the power line based on the risk value.

19. The computer program product of claim 18, further comprising:
verifying that the tree has been maintained as set forth in the work order to prevent contact with the power line by analyzing a second aerial image that is acquired after the work order was issued; and
recording, responsive to verifying that the tree has been maintained as set forth in the work order, in a database that a hazard posed by the tree has been removed.

20. A computer system comprising one or more processors and one or more computer readable storage media, and program instructions collectively stored on the one or more computer readable storage media, the program instructions executable by the one or more processors to cause the one or more processors to perform operations comprising:
identifying, by a processor, a tree type of vegetation depicted by a portion of an inputted aerial image;
segmenting, by the processor, the portion of the inputted image resulting in a contour line that defines a perimeter of a tree and shape characteristics depicted in the portion of the inputted image;
detecting, by a processor, that the tree is within a buffer distance from a power line by determining a distance between a depiction of the power line in the aerial image and a point on the contour line;
determining, by the processor, a species of the tree by comparing the contour line to candidate contour lines corresponding to respective different species of trees, the comparing comprising calculating a center point of the contour line, aligning the center point with a first center point of a first contour line from the candidate contour lines, and calculating an average deviation between a point on the contour line and a first point on the first contour line;
calculating, by the processor, a shape and a diameter of a crown of the tree using the contour line;
estimating, by the processor, a height of the tree based on the species of the tree and the diameter of the crown of the tree;
calculating, by the processor, a risk value for the tree based on a risk of contact between the power line and the tree; and issuing, by the processor, a work order to maintain the tree to prevent contact with the power line based on the risk value.

\* \* \* \* \*